Patented May 21, 1940

2,201,928

UNITED STATES PATENT OFFICE 2,201,928

PROCESS FOR PREPARING A COLLOID OXYCHLORIDE OF COPPER

Pierre François Joseph Souviron, Tarbes, and Pierre Ernest Bigourdan and Paul Bebin, Paris, France No Drawing. Application August 30, 1937, Serial No. 161,714. In France October 27, 1936

2 Claims. (Cl. 23—85)

It is already known that certain oxychlorides of copper when suspended in water present colloidal properties and that owing to said properties they have considerable advantages when used in agriculture for destroying cryptogamouses and insects. Such oxychlorides have more particularly been described in the French Patent 775,602 of June 18, 1934, and in the patent of addition 45,336 of September 1, 1934.

By the expression oxychlorides presenting colloidal properties, it is meant that the suspensions of said oxychlorides offer at the same time the following characteristics without the addition of any protecting colloidal bodies.

1. They show the Brownian movements when viewed by an ultra microscope.
2. They are opalescent.
3. They remain stable for several days or even several weeks while the suspensions of ordinary oxychlorides are entirely deposited after a few hours.

Furthermore said suspensions pass through paper filters of common quality which prevent passage of particles of ordinary oxychlorides suspended under the same conditions.

In the abovementioned French patents there has been described certain methods for preparing an oxychloride of copper the formula of which seems to be $3CuO.CuCl_2.nH_2O$ and which has colloidal properties.

By the known methods for preparing an oxychloride which seems to have the same formula, a body is obtained which does not have the colloidal properties. This is more particularly the case for those oxychlorides obtained by the action of cupric chloride or ammonium chloride on metallic copper in the presence of oxygen (air), or by the precipitation of cupric chloride by means of a base or by oxidation of cuprous chloride.

Now the applicants have found that an oxychloride not having colloidal properties, whatever might have been the way in which it was prepared, obtains said properties when submitted to a moderate calcination (say from 250° to 350° C.) and after it is hydrated either spontaneously by exposure to the air, or by incorporation therein of a small quantity of water.

Example

A certain quantity of noncolloidal oxychloride of copper is heated in the presence of air to a temperature of 250° to 350° C. for about two hours. It is thus transformed into a brown mass. Said mass is then triturated with about 15 to 20% of its own weight of pure water, or some cupric chloride is added thereto and the whole is allowed to stand. After 24 to 48 hours it may be seen that said mass has become green again and has obtained colloidal properties as described above.

It must be remembered that, as explained in the French Patent 775,602 and in its addition, the colloidal suspension occurs only if the liquid is strictly free of soluble sulphates (which result may be brought about by the addition of a small quantity of a salt of barium) and if it shows with litmus a neutral or slightly acid reaction.

What we claim is:

1. A process for preparing an anticryptogamic oxychloride of copper presenting colloidal properties, which consists in calcining an ordinary oxychloride of copper without colloidal properties at a temperature of 250° to 350° C., hydrating the calcined product, and collecting the hydrated product when it has become green.

2. A process for preparing an anticryptogamic oxychloride of copper presenting colloidal properties which consists in calcining an ordinary oxychloride of copper without colloidal properties at a temperature of 250° to 350° C., triturating the calcined product with about 15 to 20% of its own weight of water and collecting the hydrated product after 24 to 48 hours.

PIERRE FRANÇOIS JOSEPH SOUVIRON.
PIERRE ERNEST BIGOURDAN.
PAUL BEBIN.